United States Patent
Sudo

(10) Patent No.: US 11,156,910 B2
(45) Date of Patent: Oct. 26, 2021

(54) PROJECTION DISPLAY APPARATUS INCLUDING A REFLECTION DEVICE INCLUDING REFLECTION REGIONS AND TRANSMISSION REGIONS

(71) Applicant: SONY CORPORATION, Tokyo (JP)

(72) Inventor: Takashi Sudo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/609,900

(22) PCT Filed: Apr. 16, 2018

(86) PCT No.: PCT/JP2018/015717
§ 371 (c)(1),
(2) Date: Oct. 31, 2019

(87) PCT Pub. No.: WO2018/211886
PCT Pub. Date: Nov. 22, 2018

(65) Prior Publication Data
US 2020/0201162 A1 Jun. 25, 2020

(30) Foreign Application Priority Data
May 19, 2017 (JP) .............................. JP2017-099731

(51) Int. Cl.
*G03B 21/20* (2006.01)

(52) U.S. Cl.
CPC ..... *G03B 21/2066* (2013.01); *G03B 21/2013* (2013.01); *G03B 21/2033* (2013.01)

(58) Field of Classification Search
CPC .. G02B 27/141; G02B 27/143; G02B 27/146; G02B 27/147; G02B 27/149;
(Continued)

(56) References Cited

U.S. PATENT DOCUMENTS

| 6,356,577 B1 | 3/2002 | Miller |
| 7,271,961 B2 * | 9/2007 | Manabe ............. G02B 27/1026 348/338 |

(Continued)

FOREIGN PATENT DOCUMENTS

| CN | 103066496 A | 4/2013 |
| CN | 104949000 A | 9/2015 |

(Continued)

OTHER PUBLICATIONS

Extended European Search Report dated Apr. 28, 2020 in corresponding European Patent Application No. 18802279.2, 6 pages.
(Continued)

*Primary Examiner* — Bao-Luan Q Le
(74) *Attorney, Agent, or Firm* — Oblon, McClelland, Maier & Neustadt, L.L.P.

(57) ABSTRACT

A projection display apparatus according to an embodiment of the present disclosure includes: a plurality of solid-state light sources; an image generating section including a display device that modulates light emitted from the plurality of solid-state light sources; a light source optical system that guides the light emitted from the plurality of solid-state light sources to the image generating section; and a projection optical system that projects image light generated in the image generating section. The light source optical system includes a first reflection device having a plurality of reflection regions and a plurality of transmission regions, with the plurality of transmission regions being arranged in substantially the same direction as a minor-axis direction in an elliptical cross-sectional shape of light emitted from the plurality of solid-state light sources.

15 Claims, 8 Drawing Sheets

(58) Field of Classification Search
CPC ............ G02B 27/0972; G02B 27/0977; G03B 21/2013; G03B 21/2033; G03B 21/2066; G03B 21/204
See application file for complete search history.

(56) References Cited

U.S. PATENT DOCUMENTS

| | | | | |
|---|---|---|---|---|
| 8,752,981 | B2* | 6/2014 | Huang | G02B 27/102 362/235 |
| 8,842,705 | B2* | 9/2014 | Janssens | G02B 27/0961 372/35 |
| 8,905,578 | B2* | 12/2014 | Svensen | G02B 19/0057 362/241 |
| 9,004,699 | B2* | 4/2015 | Huang | G03B 33/06 353/94 |
| 9,310,033 | B2* | 4/2016 | Yamada | H04N 9/3164 |
| 9,743,053 | B2* | 8/2017 | Kita | G02B 27/102 |
| 10,819,961 | B2* | 10/2020 | Tanaka | G02B 27/0933 |
| 2006/0023172 | A1* | 2/2006 | Ikeda | G02B 27/145 353/94 |
| 2006/0250584 | A1* | 11/2006 | Manabe | G02B 27/1026 353/33 |
| 2010/0066813 | A1* | 3/2010 | Jorke | H04N 13/144 348/46 |
| 2012/0008098 | A1 | 1/2012 | Akiyama | |
| 2012/0275146 | A1* | 11/2012 | Huang | G02B 27/146 362/230 |
| 2012/0275149 | A1* | 11/2012 | Huang | G02B 27/102 362/235 |
| 2013/0077308 | A1* | 3/2013 | Svensen | G02B 19/0066 362/247 |
| 2013/0083081 | A1* | 4/2013 | Silverstein | H04N 9/3117 345/690 |
| 2013/0100974 | A1* | 4/2013 | Janssens | G03B 21/2013 372/35 |
| 2014/0333900 | A1 | 11/2014 | Aboshi et al. | |
| 2014/0354956 | A1* | 12/2014 | Yamada | H04N 9/3167 353/20 |
| 2015/0270682 | A1 | 9/2015 | Daniels et al. | |
| 2015/0309399 | A1 | 10/2015 | Kim et al. | |
| 2016/0077416 | A1 | 3/2016 | Liu et al. | |
| 2016/0195236 | A1* | 7/2016 | Kita | F21V 5/007 353/52 |
| 2016/0198135 | A1* | 7/2016 | Kita | G02B 27/48 348/756 |
| 2016/0334695 | A1* | 11/2016 | Yamada | G03B 21/2066 |
| 2017/0115554 | A1 | 4/2017 | D'Oosterlinck et al. | |
| 2017/0315430 | A1* | 11/2017 | Wang | G02B 27/141 |
| 2017/0343891 | A1* | 11/2017 | Sakata | G03B 21/206 |
| 2018/0217486 | A1* | 8/2018 | Tanaka | G03B 21/204 |
| 2019/0086779 | A1* | 3/2019 | Chang | G02B 27/143 |
| 2019/0310539 | A1* | 10/2019 | Yamagishi | G03B 21/204 |

FOREIGN PATENT DOCUMENTS

| | | |
|---|---|---|
| JP | 2012-18208 A | 1/2012 |
| JP | 2012-181260 A | 9/2012 |
| JP | 2013-114980 A | 6/2013 |
| JP | 2014082144 A | 5/2014 |
| JP | 2015-121597 A | 7/2015 |
| JP | 5842167 B2 | 1/2016 |
| JP | 5849727 B2 | 2/2016 |
| JP | 2016-197600 A | 11/2016 |
| JP | 2016-218303 A | 12/2016 |
| JP | 2017-73245 A | 4/2017 |

OTHER PUBLICATIONS

International Search Report dated Jun. 26, 2018 in PCT/JP2018/015717 filed on Apr. 16, 2018.

* cited by examiner

PROJECTION DISPLAY APPARATUS INCLUDING A REFLECTION DEVICE INCLUDING REFLECTION REGIONS AND TRANSMISSION REGIONS

TECHNICAL FIELD

The present disclosure relates to a projection display apparatus using, for example, a semiconductor laser as a light-emitting device.

BACKGROUND ART

A projection display apparatus (projector) that projects a viewing surface of a personal computer, a video image, etc. onto a screen has been requested to have higher luminance enough to allow for clear image light even in a bright place. Accordingly, in recent years, a solid-state light-emitting device such as a light-emitting diode (LED) and a laser diode (LD), as a high-luminance light source, has been adopted for a light source unit to be used in the projection display apparatus.

As a method for improving the luminance of the projection display apparatus that adopts the solid-state light-emitting device as a light source, for example, PTL 1 discloses a projection apparatus in which emission light emitted from a laser diode and having an elliptical cross-sectional shape is incident to allow a major axis thereof to be substantially parallel to a long side of an image-forming surface of a display device formed in a rectangular shape. This allows the projection apparatus to have improved intensity of reflected light per unit area on the image-forming surface of the display device.

CITATION LIST

Patent Literature

PTL 1: Japanese Unexamined Patent Application Publication No. 2015-121597

SUMMARY OF THE INVENTION

As described, a projection display apparatus is requested to have improved luminance.

It is desirable to provide a projection display apparatus that makes it possible to improve luminance.

A projection display apparatus according to an embodiment of the present disclosure includes: a plurality of solid-state light sources; an image generating section including a display device that modulates light emitted from the plurality of solid-state light sources; a light source optical system that guides the light emitted from the plurality of solid-state light sources to the image generating section; and a projection optical system that projects image light generated in the image generating section. The light source optical system includes a first reflection device having a plurality of reflection regions and a plurality of transmission regions, with the plurality of transmission regions being arranged in substantially the same direction as a minor-axis direction in an elliptical cross-sectional shape of light emitted from the plurality of solid-state light sources.

In the projection display apparatus according to the embodiment of the present disclosure, there are disposed the plurality of solid-state light sources and the first reflection device having the plurality of reflection regions and the plurality of transmission regions in the light source optical system that guides the light emitted from the plurality of solid-state light sources to the image generating section. The first reflection device is so formed as to allow an arrangement direction of the plurality of transmission regions to be substantially the same as the minor-axis direction in the elliptical cross-sectional shape of the light emitted from the plurality of solid-state light sources. This makes it possible to efficiently guide the light emitted from the plurality of solid-state light sources to the display device.

According to the projection display apparatus of the embodiment of the present disclosure, the first reflection device is disposed in the light source optical system that guides the light emitted from the plurality of solid-state light sources to the image generating section, as described above. The first reflection device has the plurality of reflection regions and the plurality of transmission regions, with the plurality of reflection regions being arranged in substantially the same direction as the minor-axis direction in the elliptical cross-sectional shape of the light emitted from the plurality of solid-state light sources. This allows the light emitted from the plurality of solid-state light sources to be efficiently guided to the display device. This makes it possible to improve the luminance.

It is to be noted that the effects of the present disclosure are not necessarily limited to the effects described here, and may be any of the effects described in the present specification.

MODES FOR CARRYING OUT THE INVENTION

Figure 1:
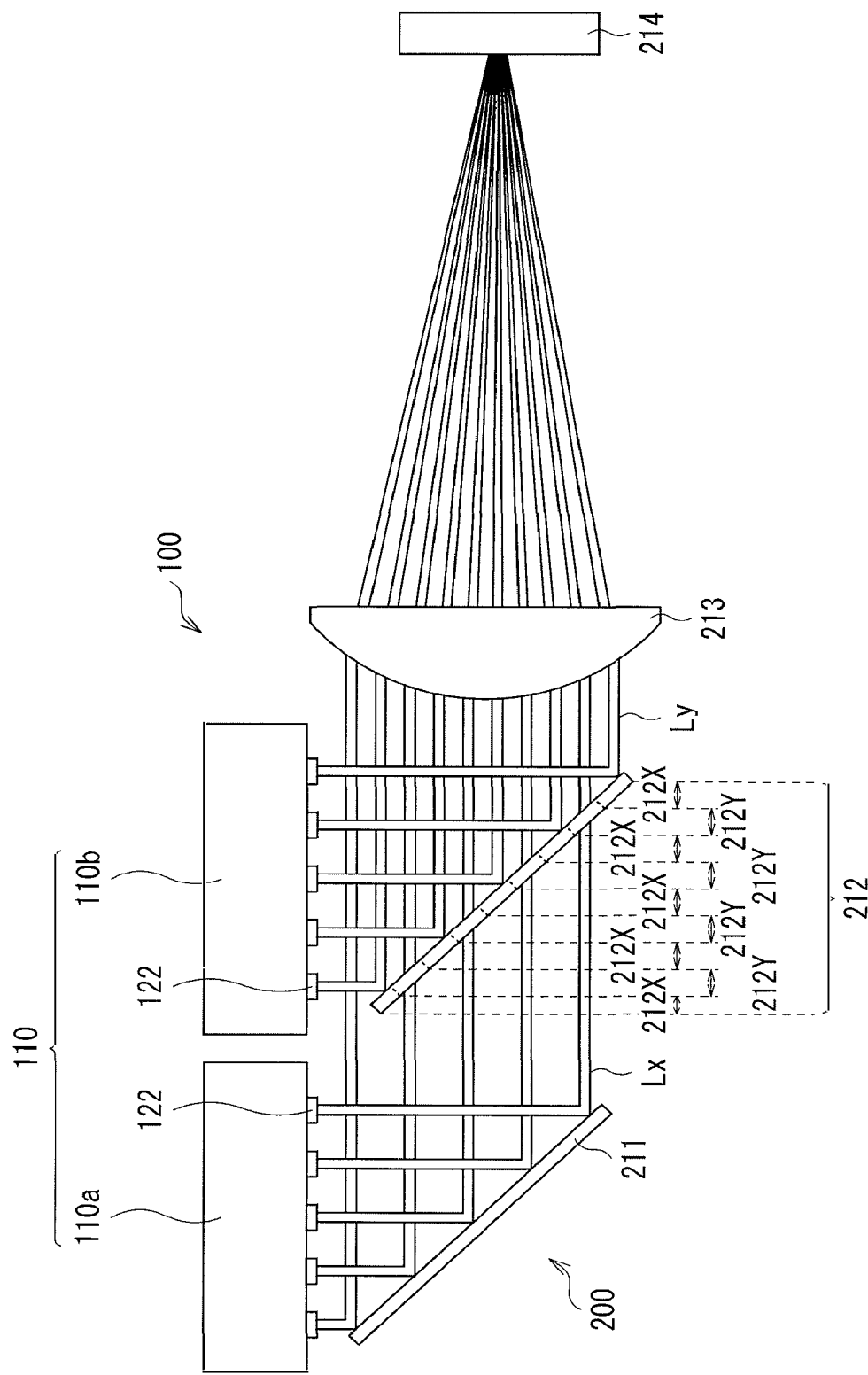
FIG. 1 is a schematic view of an example of a partial configuration of a light source unit and a light source optical system according to an embodiment of the present disclosure.

In the following, embodiments of the present disclosure are described in detail with reference to the drawings. The following description is merely a specific example of the present disclosure, and the present disclosure should not be limited to the following implementations. Moreover, the present disclosure is not limited to arrangements, dimensions, dimensional ratios, and the like of each component illustrated in the drawings. It is to be noted that the description is given in the following order.

1. Embodiment (An example of a projection display apparatus provided with a reflection mirror including a plurality of reflection regions and a plurality of transmission regions)
    1-1. Configuration of Light Source Unit and Light Source Optical System
    1-2. Configuration of Projection Display Apparatus
    1-3. Workings and Effects
2. Modification Example (An arrangement example of light source sections and reflection mirrors)

1. Embodiment

Figure 6:
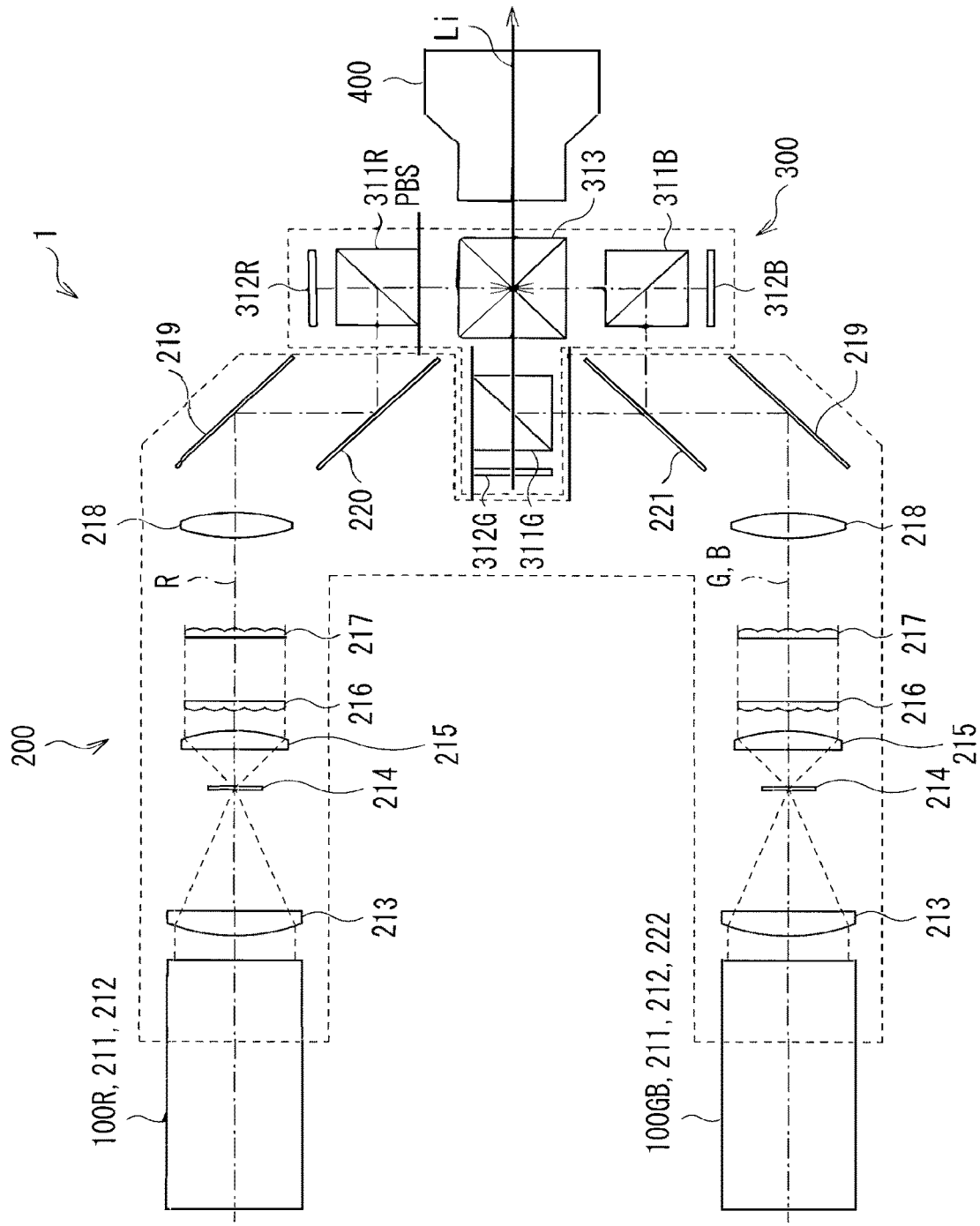
FIG. 6 is a block diagram illustrating an example of a configuration of a projection display apparatus according to an embodiment of the present disclosure.

FIG. 1 schematically illustrates an example of a partial configuration of a light source unit (light source unit 100) and a light source optical system (light source optical system 200) according to an embodiment of the present disclosure. These components are used, for example, in a projection display apparatus (e.g., projection display apparatus 1; see FIG. 6) described later. The projection display apparatus 1 includes the light source unit 100, the light source optical system 200, an image generating section 300, and a projection optical system 400. In the present embodiment, the light source optical system 200 includes, as reflection devices that reflect light emitted from the light source unit 100, a reflection mirror 212 (first reflection device) having a plurality of reflection regions 212X and a plurality of transmission regions 212Y. The reflection mirror 212 has a configuration in which the plurality of transmission regions 212Y is arranged in substantially the same direction as a minor-axis direction in an elliptical cross-sectional shape of the light emitted from the light source unit 100.

1-1. Configuration of Light Source Unit and Light Source Optical System

As illustrated in FIG. 1, the light source unit 100 includes, for example, two light source sections 110, i.e., a light source section 110a (second light source section) and a light source section 110b (first light source section). The light source section 110a and the light source section 110b are arranged side by side, and each include a plurality of light-emitting devices (e.g., semiconductor lasers 122; solid-state light sources). Specifically, the light source section 110a and the light source section 110b are each configured by, for example, a plurality of semiconductor laser arrays 120.

Figure 2:
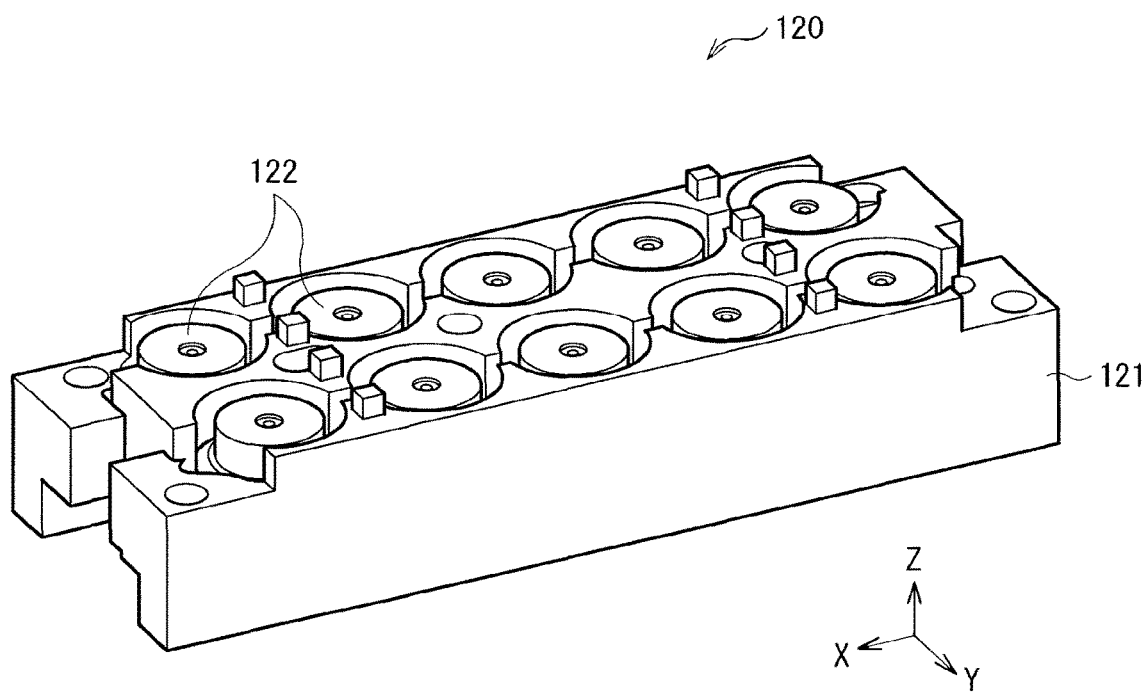
FIG. 2 is a perspective view of a structure of a semiconductor laser array that configures a light source section illustrated in FIG. 1.
Figure 3:
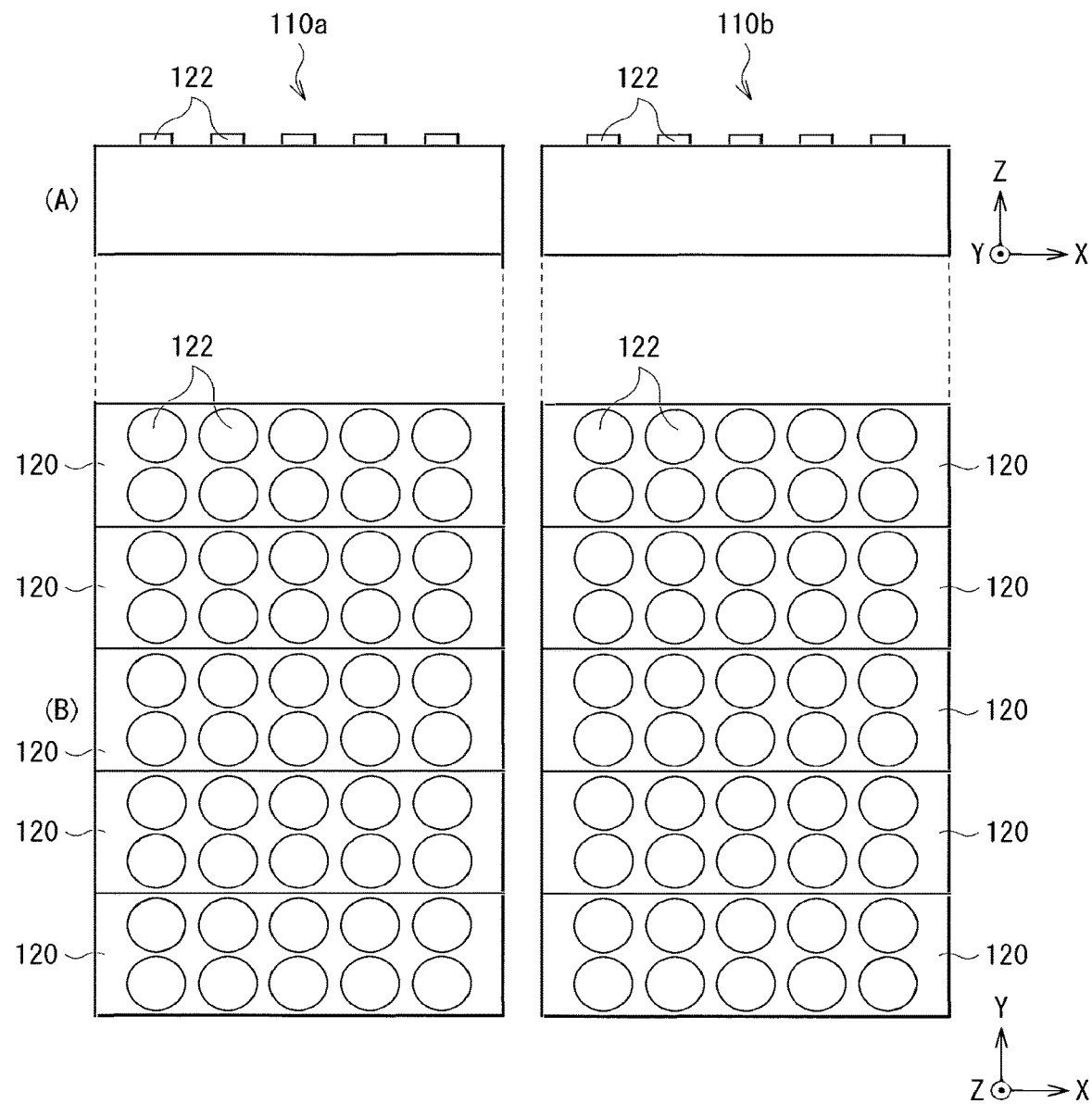
FIG. 3 is a schematic view of a cross-sectional configuration (A) and a planar configuration (B) of the light source section that configures the light source unit illustrated in FIG. 1.
Figure 5:
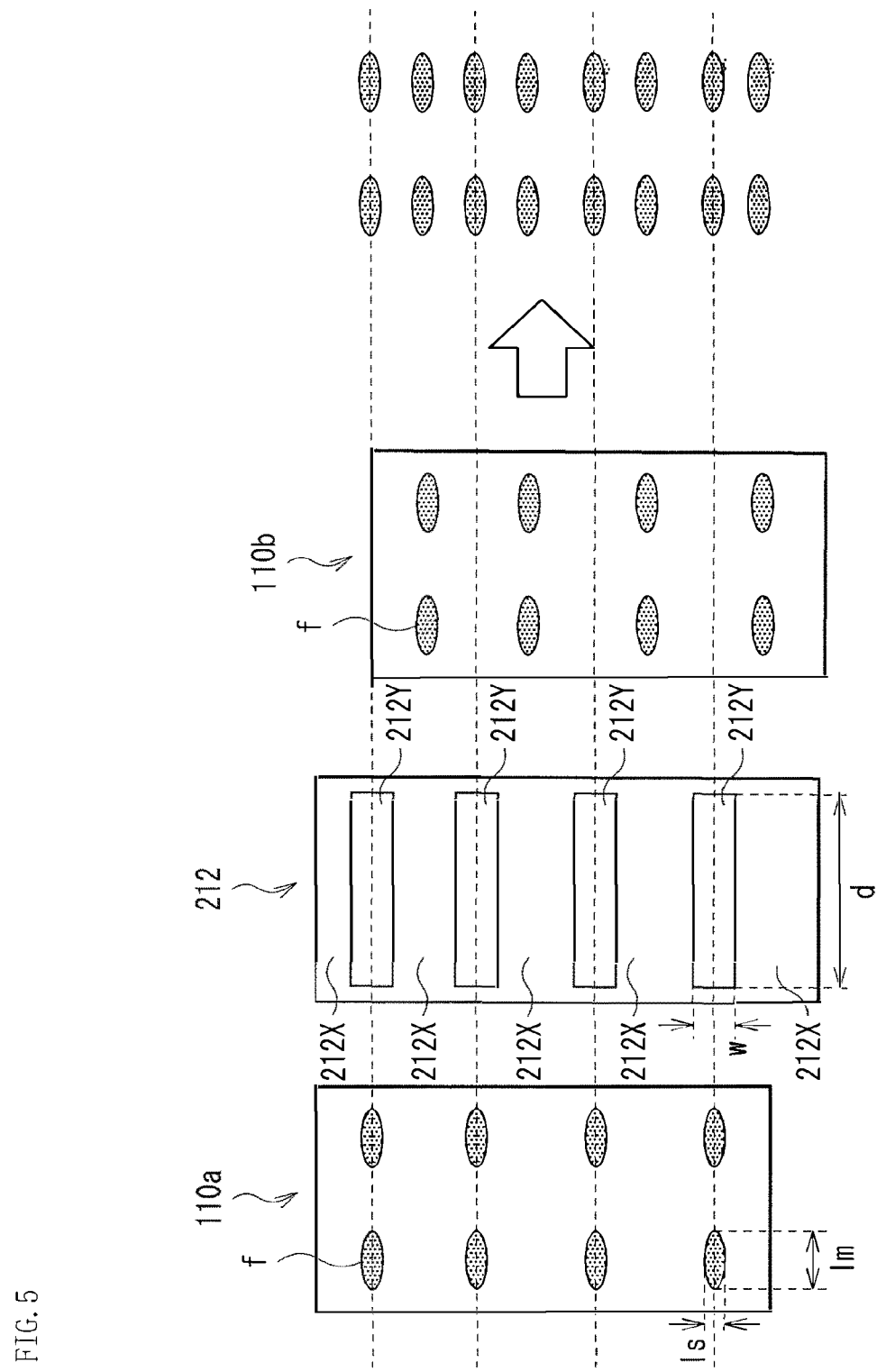
FIG. 5 illustrates a positional relationship between light emitted from two light source sections illustrated in FIG. 1 and the reflection mirror illustrated in FIG. 4 as well as density of light after combination.

FIG. 2 perspectively illustrates a configuration of the semiconductor laser array 120. The semiconductor laser array 120 has a configuration in which a plurality of (ten in this case) semiconductor lasers 122 are arranged in, for example, five rows and two columns in a pedestal part 121. (A) of FIG. 3 schematically illustrates a cross-sectional configuration of the light source section 110a and the light source section 110b, and (B) of FIG. 3 schematically illustrates a planar configuration of the light source section 110a and the light source section 110b. In the present embodiment, the light source section 110a and the light source section 110b each have a configuration in which a plurality of (five in this example) semiconductor laser arrays 120 illustrated in FIG. 2 are stacked in a column direction (Y-axis direction). A cross-sectional shape f of laser light oscillated from the semiconductor laser 122 has, for example, an elliptical shape as illustrated in FIG. 5. In the light source section 110a and the light source section 110b, a major axis and a minor axis of each of laser light Lx and laser light Ly having elliptical cross-sectional shapes oscillated from the respective semiconductor lasers 122 are each arranged in substantially the same direction.

The light source optical system 200 serves to guide light (e.g., laser light Lx and laser light Ly) emitted from the light source unit 100 to an image generating section, and is configured by a plurality of optical devices. The light source optical system 200 includes, as optical devices, a reflection mirror 211 (second reflection device) and a reflection mirror 212 (first reflection device) which are disposed in oscillation directions of the laser light (laser light Lx and laser light Ly) emitted from the light source section 110a and the light source section 110b, respectively. The reflection mirror 211 and the reflection mirror 212 are each configured by, for example, a plate-like member. The reflection mirror 211 and the reflection mirror 212 are so disposed as to be inclined in the same direction with respect to, respectively, the light source section 110a and the light source section 110b arranged side by side, for example, at diametrically opposed positions. As a result, each of the laser light Lx and the laser light Ly emitted from the respective semiconductor lasers 122 of the light source sections 110a and 110b is reflected in the same direction (toward a condensing lens 213 in FIG. 1).

The reflection mirror 211 and the reflection mirror 212 are each configured by, for example, a metal film deposition mirror or a dielectric multilayer film mirror.

In the present embodiment, among the two reflection mirrors 211 and 212, the reflection mirror 212 disposed closer to the condensing lens, i.e., the reflection mirror 212 disposed on an optical path of the laser light Lx emitted from the light source section 110a and reflected by the reflection mirror 211 has a configuration in which the plurality of reflection regions 212X and the plurality of transmission regions 212Y are provided as described above. It is to be noted that the reflection region 212X is a region that reflects light and bends the light in a direction substantially perpendicular to an incident direction, and the transmission region 212Y is a region that transmits light.

Figure 4:
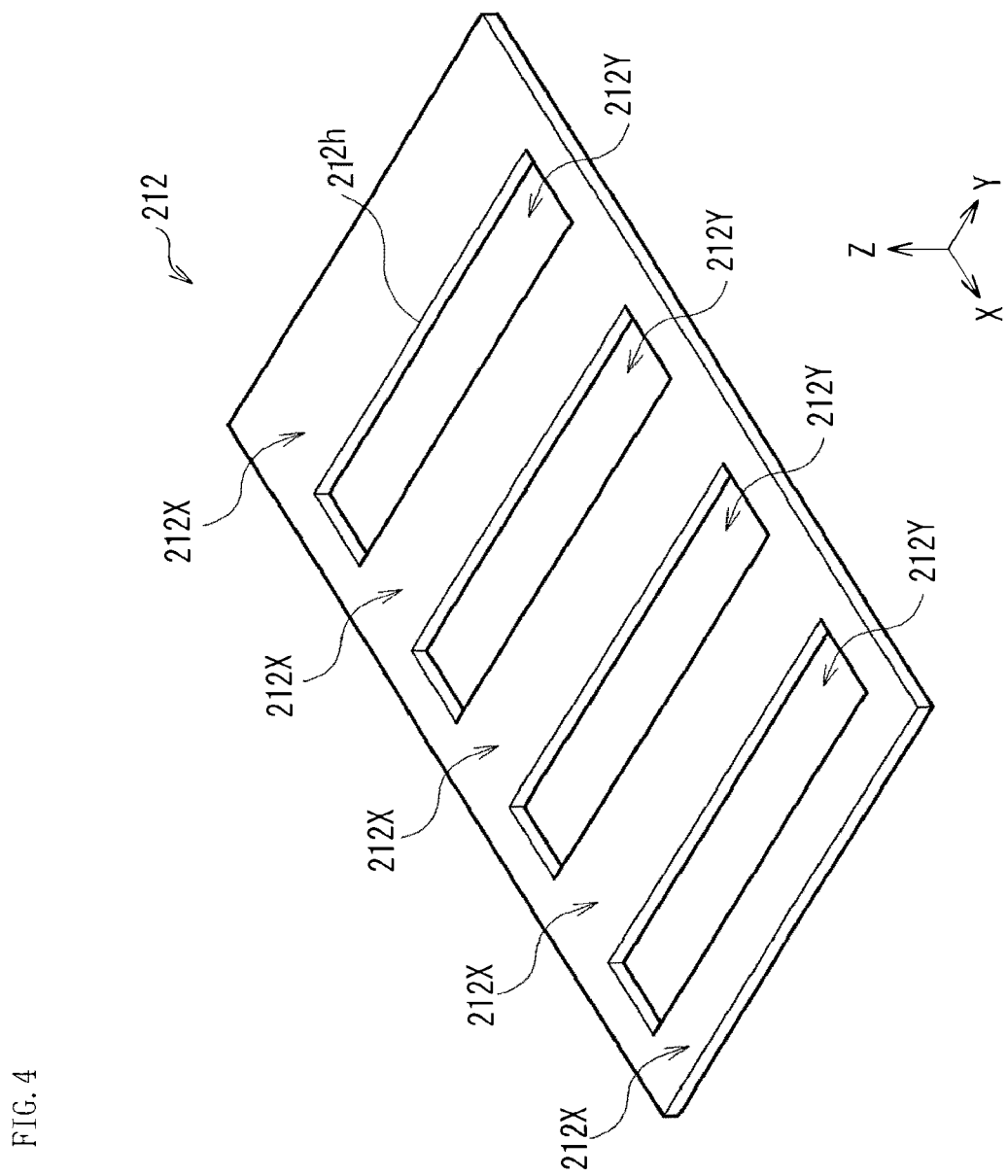
FIG. 4 is a perspective view of a structure of a reflection mirror illustrated in FIG. 1.

The plurality of reflection regions 212X and the plurality of transmission regions 212Y are arranged alternately. Arrangement thereof, for example, an arrangement direction of the plurality of transmission regions 212Y is preferably substantially the same as a minor-axis direction in an elliptical cross-sectional shape of the laser light emitted from the semiconductor laser 122. Further, it is preferable that one or both of the plurality of reflection regions 212X and the plurality of transmission regions 212Y have, for example, a rectangular shape, and that a long-side direction thereof be so formed as to be substantially parallel to a major-axis direction in the elliptical cross-sectional shape of the laser light emitted from the semiconductor laser 122. FIG. 4 perspectively illustrates a configuration of the reflection mirror 212. The plurality of transmission regions 212Y of the reflection mirror 212 is configured by a plurality of openings 212h provided in, for example, the metal film deposition mirror or the dielectric multilayer film mirror. Further, the plurality of transmission regions 212Y may be configured by using, for example, a parallel flat plate-shaped transparent member. In this case, it is preferable to form an antireflection film on a surface of the transparent member.

FIG. 5 illustrates a positional relationship between the laser light Lx as well as the laser light Ly emitted from the light source sections 110a and 110b and the plurality of reflection regions 212X as well as the plurality of transmission regions 212Y of the reflection mirror 212; FIG. 5 also illustrates density of light after combination. As illustrated in FIG. 1, the laser light Lx emitted from the light source section 110a is reflected by the reflection mirror 211. The reflection mirror 212 is provided beyond a location of the reflection, and the respective transmission regions 212Y are formed in the reflection mirror 212 on optical paths of the laser light beams Lx. The laser light beams Lx pass through the respective transmission regions 212Y, and enter the condensing lens 213. The laser light beams Ly emitted from the light source section 110b are reflected by the respective reflection regions 212X of the reflection mirror 212, and enter the condensing lens 213 together with the laser light beams Lx. At this time, the laser light Lx and the laser light Ly enter the condensing lens 213 independently of each other without intersecting each other. The laser light Lx and the laser light Ly combined by the condensing lens 213 are arranged alternately as illustrated in a location pointed by an arrow in FIG. 5. Optical density thereof is doubled as compared with the optical density of each of the laser light Lx and the laser light Ly emitted from the light source section 110a and the light source section 110b, respectively. That is, luminance per unit area is improved by a factor of two.

It is to be noted that, as described above, in order to efficiently improve the luminance per unit area, it is desirable to provide the reflection mirror 212 to allow the plurality of transmission regions 212Y to be arranged on the respective optical paths of the laser light beams Lx reflected by the reflection mirror 211, and to allow the plurality of reflection regions 212X to be arranged on the respective optical paths of the laser light beams Ly emitted from the light source section 110b.

Further, a width w (length in a short-side direction) of each of the transmission regions 212Y is preferably equal to or greater than a length ls of each of the laser light beams Lx in a minor-axis direction; for example, the width w is preferably equal to or greater than 1 s×1.5 in view of a manufacturing margin, and the like. In addition, a depth (length in a long-side direction) d of each of the transmission regions 212Y is preferably equal to or greater than a length lm of each of the laser light beams Lx in the major-axis direction; for example, the depth d is preferably equal to or greater than 1 s×1.5 in view of a manufacturing margin, and the like. The same holds true also for each of the reflection regions 212X. This makes it possible to combine the laser light Lx and the laser light Ly with no waste.

As described above, in the present embodiment, the reflection mirror 212 having the above-described configuration is disposed in the oscillation direction of the laser light Ly emitted from the light source section 110 disposed closer to the condensing lens 213 among the light source section 110a and the light source section 110b arranged side by side. This allows the laser light Lx and the laser light Ly emitted respectively from the light source section 110a and the light source section 110b to be efficiently combined. This makes it possible to improve luminance in the projection display apparatus 1 described later.

1-2. Configuration of Projection Display Apparatus

As described above, the projection display apparatus 1 of the present embodiment includes, in order, the light source unit 100, the light source optical system 200, the image generating section 300, and the projection optical system 400. The projection display apparatus 1 illustrated in FIG. 6 exemplifies a transmissive 3LCD (liquid crystal display) type projection display apparatus in which light is modulated by a reflective liquid crystal panel (liquid crystal panels 312R, 312G, and 312B); however, this is not limitative. For example, the projection display apparatus 1 may be configured as a projection display apparatus of a reflective 3LCD type in which light is modulated by a transmissive liquid crystal panel.

It is to be noted that the liquid crystal panels 312R, 312G, and 312B each correspond to a specific example of the display device of the present disclosure. Further, the projection display apparatus 1 of the present embodiment is also applicable to a projector using, for example, a digital micromirror device (DMD: Digital Micromirror Device) or the like instead of the reflective liquid crystal panel and the transmissive liquid crystal panel.

In the light source unit 100, light sources that emit red light (R), green light (G), and blue light (B) required for color image display are arranged. In the present embodiment, the light source unit 100 is provided with a light source unit 100R that emits the red light (R) and a light source unit 100GB that emits the green light (G) and the blue light (B). In each of the light source units 100R and 100GB, for example, a solid-state light source such as a semiconductor laser (LD) or a light-emitting diode (LED) which oscillates laser light of a corresponding wavelength is used as a light source.

Figure 7:
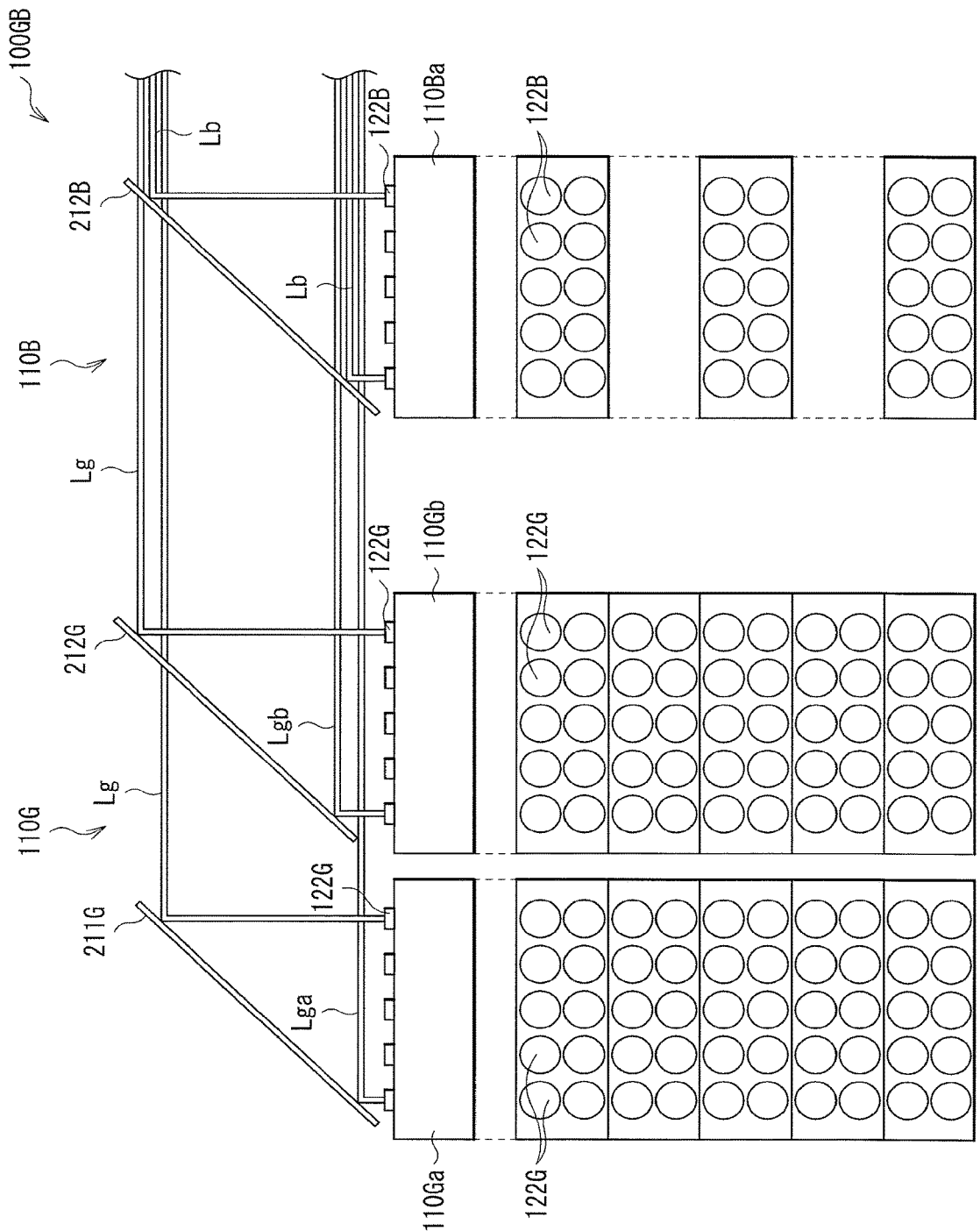
FIG. 7 is a schematic view of an example of a partial configuration of a light source unit and a light source optical system illustrated in FIG. 6.

FIG. 7 schematically illustrates a portion of configurations of the light source unit 100GB that emits the green light (G) and the blue light (B) and the light source optical system 200 thereof. In general, an emission efficiency of a semiconductor laser 122G that emits the green light (G) is lower than that of the semiconductor laser 122B that emits the blue light (B). Accordingly, as illustrated in FIG. 7, it is preferable to use a larger number of semiconductor lasers 122G in the light source section 110G of the green light (G) than the light source section 110B of the blue light (B); the configuration of the light source section 110G is made by, for example, two light source sections 110Ga and 110Gb, similarly to the light source section 110 illustrated in FIG. 1. The light source section 110B of the blue light (B) is configured by, for example, a light source section 110Ba including three semiconductor laser arrays, as illustrated in FIG. 7, in accordance with light emission intensity obtained from the light source section 110G of the green light (G). The light source sections 110Ga, 110Gb, and 110Ba are arranged side by side in this order, for example, toward the condensing lens 213.

Reflection mirrors 211G, 212G, and 212B are arranged in respective oscillation directions of laser light beams Lga, Lgb, and Lb emitted from the light source sections 110Ga, 110Gb, and 110Ba, respectively. The reflection mirror 211G is a typical total reflection mirror, similarly to the above-described reflection mirror 211. The reflection mirror 212G and the reflection mirror 212B each have a configuration similar to that of the reflection mirror 212 described above, and each have a plurality of reflection regions and a plurality of transmission regions.

Positions where the reflection mirrors 211G, 212G, and 212B are provided are so adjusted that the laser light Lga reflected by the reflection mirror 211G and the laser light beams Lgb and Lb reflected respectively by the reflection mirrors 212G and 212B enter the condensing lens 213 independently of one another, without the optical paths thereof intersecting one another. That is, the laser light Lgb emitted from the light source section 110Gb is reflected at the plurality of reflection regions of the reflection mirror 212G. The laser light Lga emitted from the light source section 110Ga and reflected by the reflection mirror 211G is transmitted through the plurality of transmission regions of the reflection mirror 212G. The laser light Lb emitted from the light source section 110Ba is reflected at the plurality of reflection regions of the reflection mirror 212B. The laser light Lga reflected by the reflection mirror 211G and the laser light Lgb reflected by the plurality of reflection regions of the reflection mirror 212G are each transmitted through the plurality of transmission regions of the reflection mirror 212B.

It is to be noted that the light source unit 100R may adopt a typical configuration, or may adopt, for example, a configuration similar to that of the light source unit 100 illustrated in FIG. 1.

The light source optical system 200 includes a plurality of optical devices on respective optical paths of light (the red light (R), and the green light (G) and the blue light (B)) emitted from the light source unit 100R and the light source unit 100GB, respectively. As an example, there are disposed, on the optical path of the light source unit 100R, the above-described reflection mirrors 211 and 212, the condensing lens 213, a diffusion plate 214, a collimator lens 215, fly-eye lenses 216 and 217, a condenser lens 218, and turning mirrors 219 and 220. There are disposed, on the optical path of the light source unit 100GB, for example, the above-described reflection mirrors 211G, 212G, and 212B, the condensing lens 213, the diffusion plate 214, the collimator lens 215, the fly-eye lenses 216 and 217, the condenser lens 218, the turning mirror 219, and a dichroic mirror 221.

Light (the red light (R), and the green light (G) and the blue light (B)) emitted respectively from the light source units 100R and 100GB and passed through the reflection mirrors 211G and 212G (or the reflection mirrors 211G, 212G, and 212B) is condensed on the diffusion plate 214 by the condensing lens 213. Each of the condensed red light (R), green light (G), and blue light (B) is diffused by the diffusion plate 214, and enters the collimator lens 215. Each of the red light (R), the green light (G), and the blue light (B) transmitted through the collimator lens 215 is split, by macro lenses of the fly-eye lens 216, into a plurality of light fluxes, which are respectively imaged on corresponding macro lenses of the fly-eye lens 217. Each of the micro lenses of the fly-eye lens 217 serves as a secondary light source. Each of the red light (R), the green light (G), and the blue light (B) having passed through the fly-eye lens 217 is condensed by the condenser lens 218.

The turning mirrors 219 and 220 are disposed on the optical path of the red light (R); the red light (R) condensed by the condenser lens 218 is sequentially reflected by the turning mirrors 219 and 220, and enters a polarization beam splitter (PBS) 311R. The turning mirror 219 and the dichroic mirror 221 are disposed on the optical path of each of the green light (G) and the blue light (B); each of the green light (G) and the blue light (B) condensed by the condenser lens 218 is reflected by the turning mirror 219 and enters the dichroic mirror 221, and the dichroic mirror 221 performs separation into the green light (G) and the blue light (B).

The image generating section 300 includes PBS 311R, 311G, and 311B, liquid crystal panels 312R, 312G, and 312B, and a dichroic prism 313.

The PBS 311R is disposed on the optical path of the red light (R), and has a function of separating the incident red light (R) into two polarization components orthogonal to each other on a polarization separating surface. The PBS 311G is disposed on the optical path of the green light (G), and has a function of separating the incident green light (G) into two polarization components orthogonal to each other on a polarization separating surface. The PBS 311B is disposed on the optical path of the blue light (B), and has a function of separating the incident blue light (B) into two polarization components orthogonal to each other on a polarization separating surface. Each polarization separating surface reflects one polarization component (e.g., S-polarization component) and transmits the other polarization component (e.g., P-polarization component).

The liquid crystal panels 312R, 312G, and 312B are each a reflective liquid crystal panel, and generate image light of each color by modulating incident light on the basis of an input image signal. The liquid crystal panel 312R is disposed on the optical path of the red light (R) reflected at the polarization separating surface of the PBS 311R. The liquid crystal panel 312R is driven by a digital signal subjected to pulse-width modulation (PWM) in accordance with a red image signal, for example, and has a function of modulating incident light by the digital signal and reflecting the modulated light toward the PBS 311R. The liquid crystal panel 312G is disposed on the optical path of the green light (G) reflected at the polarization separating surface of the PBS 311G. The liquid crystal panel 312G is driven by a digital signal subjected to pulse-width modulation (PWM) in accordance with a green image signal, for example, and has a function of modulating incident light by the digital signal and reflecting the modulated light toward the PBS 311G. The liquid crystal panel 312B is disposed on the optical path of the blue light B reflected at the polarization separating surface of the PBS 311B. The liquid crystal panel 312B is driven by a digital signal subjected to pulse-width modulation (PWM) in accordance with a blue image signal, for example, and has a function of modulating incident light by the digital signal and reflecting the modulated light toward the PBS 311B.

The red light (R), the green light (G), and the blue light (B) reflected by the liquid crystal panels 312R, 312G, and 312B pass through the PBS 311R, 311G, and 311B, respectively, and enter the dichroic prism 313.

The dichroic prism 313 superimposes and combines the red light (R), the green light (G), and the blue light (B) incident in three directions, and outputs the combined image light (Li) toward the projection optical system 400.

The projection optical system 400 includes a plurality of lenses, and enlarges the image light (Li) combined by the dichroic prism 313 to project the image light Li onto a screen (not illustrated).

1-3. Workings and Effects

As described above, the projection display apparatus has been requested to have higher luminance enough to allow for clear image light even in a bright place. In recent years, the solid-state light source such as LED and LD has been adopted as a light source for the projection display apparatus. As a method for improving the luminance of the projection display apparatus that uses a solid-state light source, for example, it is considered that a major axis of emitted light emitted from LD and having an elliptical cross-sectional shape and a long side of an image-forming surface of a display device formed in a rectangular shape are substantially parallel to each other. In this method, intensity of reflected light per unit area on the image-forming surface of the display device is improved to achieve high luminance.

Other conceivable methods include increasing the number of the solid-state light source. However, in a case where the number of the solid-state light source is doubled and the solid-state light sources are simply arranged on a plane, for example, the size of the condensing lens and the distance between the condensing lens and the diffusion plate are doubled, resulting in an issue of increased size of the light source unit.

Meanwhile, in the present embodiment, in the light source optical system 200 that guides laser light emitted from the light source section 110 including the plurality of semiconductor lasers 122 to the image generating section 300, the reflection mirror 212 is provided which includes the plurality of reflection regions 212X and the plurality of transmission regions 212Y. In the reflection mirror 212, the plurality of transmission regions 212Y is arranged in substantially the same direction as the minor-axis direction in the elliptical cross-sectional shape of the laser light emitted from the light source section 110. This makes it possible to efficiently guide laser light L emitted from the plurality of solid-state light sources to the image generating section 300.

As described above, in the projection display apparatus 1 of the present embodiment, as an optical device that configures the light source optical system 200, the reflection mirror 212, which includes the plurality of reflection regions 212X and the plurality of transmission regions 212Y, is provided to allow the plurality of transmission regions 212Y to be arranged in substantially the same direction as the minor-axis direction in the elliptical cross-sectional shape of the laser light emitted from the light source section 110, as described above. As a result, the laser light L emitted from the light source section 110 is efficiently guided to the image generating section 300, thus making it possible to improve the luminance.

In the present embodiment, a plurality of light source sections (e.g., two light source sections 110a and 110b) configured by the plurality of semiconductor laser arrays 120 each including the plurality of semiconductor lasers 122 are arranged side by side. The above-described reflection mirror 212 is disposed in the oscillation direction of the laser light Ly emitted from the light source section 110b, disposed closer to the display device (e.g., the liquid crystal panels 312R, 312G, and 312B), among the light source section 110a and the light source section 110b arranged side by side. In addition, the reflection mirror 211 configured by, for example, a total reflection mirror is disposed in the oscillation direction of the laser light Lx emitted from the light source section 110a. As a result, a plurality of laser light beams Lx emitted from the light source section 110a and reflected by the reflection mirror 211 pass through the respective transmission regions 212Y of the reflection mirror 212. A plurality of laser light beams Ly emitted from the light source section 110b are reflected by the respective reflection regions 212X of the reflection mirror 212, and enter, for example, the condensing lens 213 together with the plurality of laser light beams Lx to be combined together. This makes it possible to improve the luminance while suppressing the increase in size of the light source unit 100, as compared with the case where the number of the semiconductor laser is simply increased as described above.

2. Modification Example

Description is given next of a modification example of the foregoing embodiment. It is to be noted that components corresponding to those of the light source unit 100 and the light source optical system 200 of the foregoing embodiment are denoted by the same reference numerals, and descriptions thereof are omitted.

Figure 8:
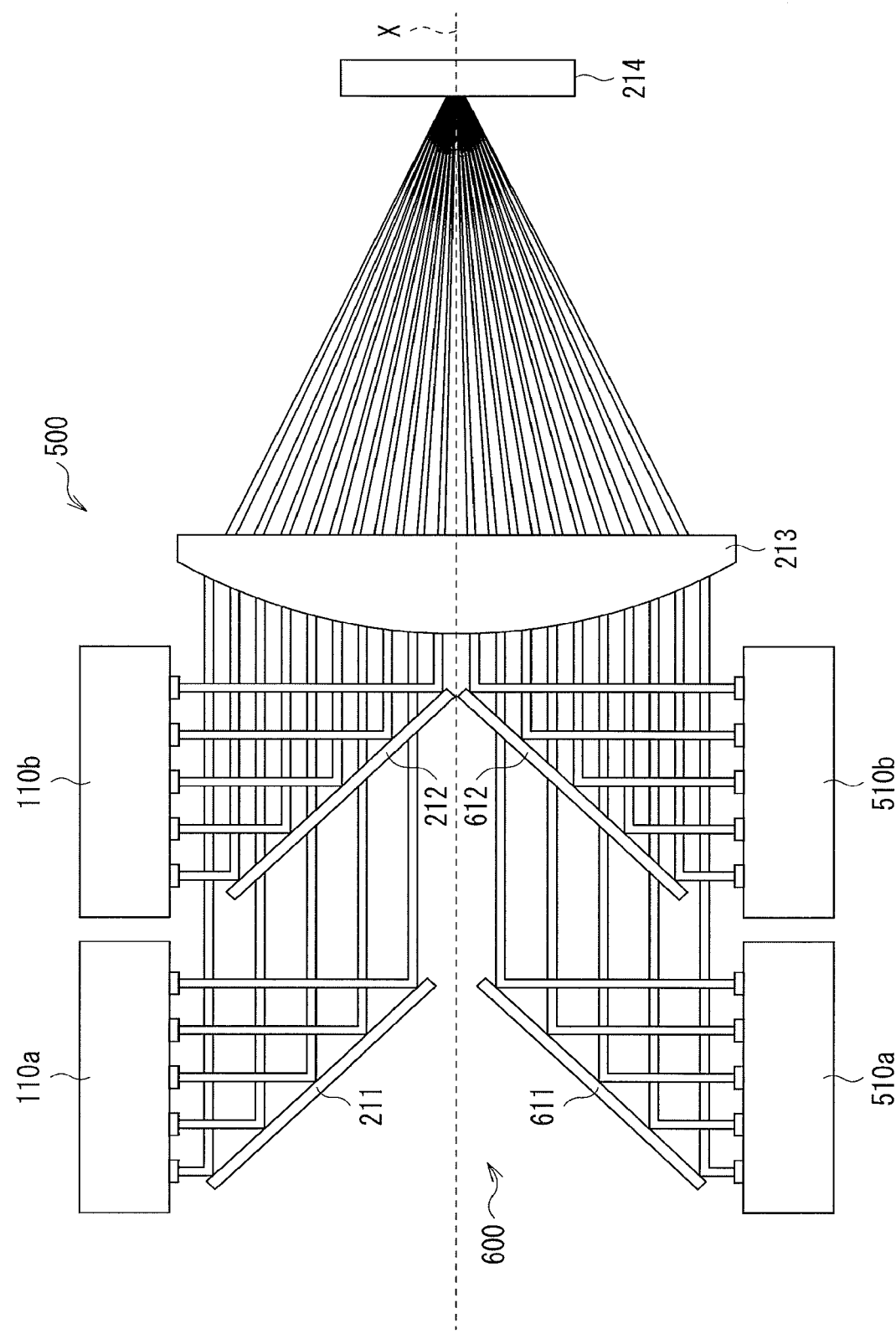
FIG. 8 is a schematic view of an example of a partial configuration of a light source unit and a light source optical system according to a modification example of the present disclosure.

FIG. 8 schematically illustrates an example of a partial configuration of a light source unit (light source unit 500) and a light source optical system (light source optical system 600) according to a modification example of the present disclosure. These components are used in a projection display apparatus (e.g., the projection display apparatus 1) similarly to the foregoing embodiment. In the present modification example, for example, a light source section 510a and a light source section 510b that have similar configurations are disposed at positions, for example, diametrically opposed to the light source section 110a and the light source section 110b with respect to a broken line X, as a symmetry axis, that passes through the center of the condensing lens 213. Further, a reflection mirror 511 and a reflection mirror 512 that have configurations similar, respectively, to those of the reflection mirror 211 and the reflection mirror 212 are arranged in respective oscillation directions of the laser light beams L emitted from the light source section 510a and the light source section 510b.

In this manner, disposing the plurality of light source sections (four light source sections 110a, 110b, 510a, and 510b in this example) and the reflection mirrors 211, 212, 511, and 512 of the present disclosure in line symmetry makes it possible to further improve the luminance while suppressing the increase in size of the light source unit 100.

Although the present disclosure has been described hereinabove with reference to the embodiment and the modification example, the present disclosure is not limited to the foregoing embodiment, etc., and may be modified in a variety of ways.

It is to be noted that the effects described herein are merely exemplary. The effects of the present disclosure are not limited to the effects described herein. The present disclosure may have other effects than those described herein.

Further, for example, the present disclosure may also have the following configurations.

(1)

A projection display apparatus including:

a plurality of solid-state light sources;

an image generating section including a display device that modulates light emitted from the plurality of solid-state light sources;

a light source optical system that guides the light emitted from the plurality of solid-state light sources to the image generating section; and a projection optical system that projects image light generated in the image generating section, the light source optical system including a first reflection device having a plurality of reflection regions and a plurality of transmission regions, and the plurality of transmission regions being arranged in substantially same direction as a minor-axis direction in an elliptical cross-sectional shape of light emitted from the plurality of solid-state light sources.

(2)

The projection display apparatus according to (1), in which, in the first reflection device, the plurality of reflection regions and the plurality of transmission regions are arranged alternately.

(3)

The projection display apparatus according to (1) or (2), in which a longitudinal direction of the transmission region and a major-axis direction of the elliptical cross-sectional shape of the light emitted from the plurality of solid-state light sources are substantially same.

(4)

The projection display apparatus according to any one of (1) to (3), further including a first light source section and a second light source section each including the plurality of solid-state light sources, in which the light source optical system includes the first reflection device in a direction in which light is emitted from the first light source section and includes a second reflection device in a direction in which light is emitted from the second light source section.

(5)

The projection display apparatus according to (4), in which the first light source section and the second light source section are arranged side by side in this order with respect to the display device.

(6)

The projection display apparatus according to (4) or (5), in which the first reflection device reflects, at the plurality of reflection regions, light emitted from the first light source section, and transmits, through the plurality of transmission regions, light emitted from the second light source section and reflected by the second reflection device.

(7)

The projection display apparatus according to any one of (1) to (6), in which the first reflection device is configured by a mirror, and the plurality of transmission regions is configured by openings formed in the mirror.

(8)

The projection display apparatus according to any one of (4) or (6), further including a third light source section and a fourth light source section that are diametrically opposed to the first light source section and the second light source section, respectively.

(9)

The projection display apparatus according to (8), in which the light source optical system further includes a third reflection device and a fourth reflection device, respectively, in a direction in which light is emitted from the third light source section and in a direction in which light is emitted from the fourth light source section, and the third reflection device includes a plurality of reflection regions and a plurality of transmission regions that are arranged alternately.

This application claims the benefit of Japanese Priority Patent Application JP2017-099731 filed on May 19, 2017, the entire contents of which are incorporated herein by reference.

It should be understood by those skilled in the art that various modifications, combinations, sub-combinations and alternations may occur depending on design requirements and other factors insofar as they are within the scope of the appended claims or the equivalents thereof.

The invention claimed is:

1. A projection display apparatus comprising:
a first light source and a second light source each including a plurality of solid-state light sources;
a display device configured to modulate light emitted from the first light source and the second light source;
a light source optical system configured to guide the light emitted from the first light source and the second light source to the display device; and
a projection optical system configured to project image light generated in the display device, wherein
the light source optical system includes a first reflection device having a plurality of reflection regions and a plurality of transmission regions,
the light source optical system includes a condensing lens,
in a case where the light source optical system includes multiple devices that reflect light and are disposed upstream from the condensing lens, among the multiple devices the first reflection device is disposed closest to the condensing lens,
the plurality of transmission regions are arranged in substantially same direction as a minor-axis direction in an elliptical cross-sectional shape of light emitted from the first light source and the second light source,
the first light source is configured to emit light of a first color and the second light source is configured to emit light of a second color different from the first color,
the first reflection device includes a first side and a second side,
the first reflection device is disposed so that all light directed to the first side is light of the first color,
the first reflection device is disposed so that all light directed to the second side is light of the second color, and
the first reflection device is configured to reflect, at the plurality of reflection regions, the first color of light emitted from the first light source and transmit, through the plurality of transmission regions, the second color of light emitted from the second light source.

2. The projection display apparatus according to claim 1, wherein, in the first reflection device, the plurality of reflection regions and the plurality of transmission regions are arranged alternately.

3. The projection display apparatus according to claim 1, wherein a longitudinal direction of the plurality of transmission regions and a major-axis direction of the elliptical cross-sectional shape of the light emitted from the first light source and the second light source are substantially same.

4. The projection display apparatus according to claim 1, wherein the light source optical system includes the first reflection device in a direction in which light is emitted from the first light source and includes a second reflection device in a direction in which light is emitted from the second light source.

5. The projection display apparatus according to claim 4, wherein the first light source and the second light source are arranged side by side in this order with respect to the display device.

6. The projection display apparatus according to claim 4, wherein the first reflection device is configured to reflect, through the plurality of transmission regions, light reflected by the second reflection device.

7. The projection display apparatus according to claim 1, wherein
the first reflection device is configured by a mirror, and
the plurality of transmission regions is configured by openings formed in the mirror.

8. The projection display apparatus according to claim 4, further comprising a third light source and a fourth light source that are diametrically opposed to the first light source and the second light source, respectively.

9. The projection display apparatus according to claim 8, wherein
the light source optical system further includes a third reflection device and a fourth reflection device, respectively, in a direction in which light is emitted from the third light source and in a direction in which light is emitted from the fourth light source, and
the third reflection device includes a plurality of reflection regions and a plurality of transmission regions that are arranged alternately.

10. The projection display apparatus according to claim 8, wherein the third light source is configured to emit light of the first color and the fourth light source is configured to emit light of the second color.

11. The projection apparatus according to claim 1, wherein a number of the plurality of reflection regions is different from a number of the plurality of transmission regions.

12. The projection display apparatus according to claim 11, wherein the number of the plurality of transmission regions is at least twice that of the number of the plurality of reflection regions.

13. The projection display apparatus according to claim 1, further comprising a third light source including a plurality of solid-state light sources, wherein the third light source is configured to emit light of the second color, and the first reflection device is configured to transmit, through a first plurality of the transmission regions, the second color of light emitted from the second light source and transmit, through a second plurality of the transmission regions, the second color of light transmitted from the third light source.

14. The projection display apparatus according to claim 13, wherein the first light source, the second light source, and the third light source are arranged side by side in this order with respect to the display device.

15. The projection display apparatus according to claim 13, further comprising a fourth light source, a fifth light source, and a sixth light source that are diametrically opposed to the first light source, the second light source, and the third light source, respectively.

* * * * *